United States Patent
Noguchi

(10) Patent No.: US 10,250,764 B2
(45) Date of Patent: Apr. 2, 2019

(54) DISPLAY SYSTEM, CONTROL DEVICE, AND NON-TRANSITORY COMPUTER READABLE MEDIUM

(71) Applicant: FUJI XEROX CO., LTD., Tokyo (JP)

(72) Inventor: Daisuke Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/446,697

(22) Filed: Mar. 1, 2017

(65) Prior Publication Data

US 2018/0054532 A1 Feb. 22, 2018

(30) Foreign Application Priority Data

Aug. 17, 2016 (JP) ................. 2016-160218

(51) Int. Cl.
*H04N 1/00* (2006.01)
*G06F 3/01* (2006.01)
*G06T 19/00* (2011.01)

(52) U.S. Cl.
CPC ........ *H04N 1/00456* (2013.01); *G06F 3/013* (2013.01); *H04N 1/0057* (2013.01); *H04N 1/00411* (2013.01); *H04N 1/00506* (2013.01); *H04N 1/00623* (2013.01); *G06T 19/006* (2013.01); *H04N 2201/0082* (2013.01); *H04N 2201/0089* (2013.01)

(58) Field of Classification Search
CPC ........... H04N 1/00456; H04N 1/00411; H04N 1/00506; H04N 1/0057; H04N 1/00623; H04N 2201/0089; G06F 3/013; G06T 19/006; G04N 2201/0082
USPC ...................................................... 358/1.12
See application file for complete search history.

(56) References Cited

U.S. PATENT DOCUMENTS

| 9,313,341 B2 * | 4/2016 | Miyagawa ......... H04N 1/00005 |
| 2013/0114100 A1 | 5/2013 | Torii et al. |
| 2014/0293329 A1 | 10/2014 | Shimizu et al. |
| 2015/0138595 A1 | 5/2015 | Sugimoto |
| 2016/0269578 A1 * | 9/2016 | Nozawa ............. H04N 1/00493 |

FOREIGN PATENT DOCUMENTS

| JP | 2013-140563 A | 7/2013 |
| JP | 2014-194725 A | 10/2014 |
| JP | 2015-099448 A | 5/2015 |

OTHER PUBLICATIONS

Jun. 15, 2018 Office Action issued in Australian Application No. 2017202794.

* cited by examiner

*Primary Examiner* — Saeid Ebrahimi Dehkordy
(74) *Attorney, Agent, or Firm* — Oliff PLC

(57) ABSTRACT

A display system includes a display apparatus, at least one recording medium container, and a display controller. The display apparatus includes a display that displays an image. The display apparatus enables a user to see an object by using the display apparatus. The object is actually located on a line extending from a line of sight of the user. The at least one recording medium container accommodates a recording medium on which an image is to be formed. The display controller displays, on the display, information regarding an intended image that is an image to be formed on the recording medium to be placed in the recording medium container. The display controller displays the information when the user looks at the recording medium container by using the display apparatus.

22 Claims, 10 Drawing Sheets

NEW YEAR'S POST CARD

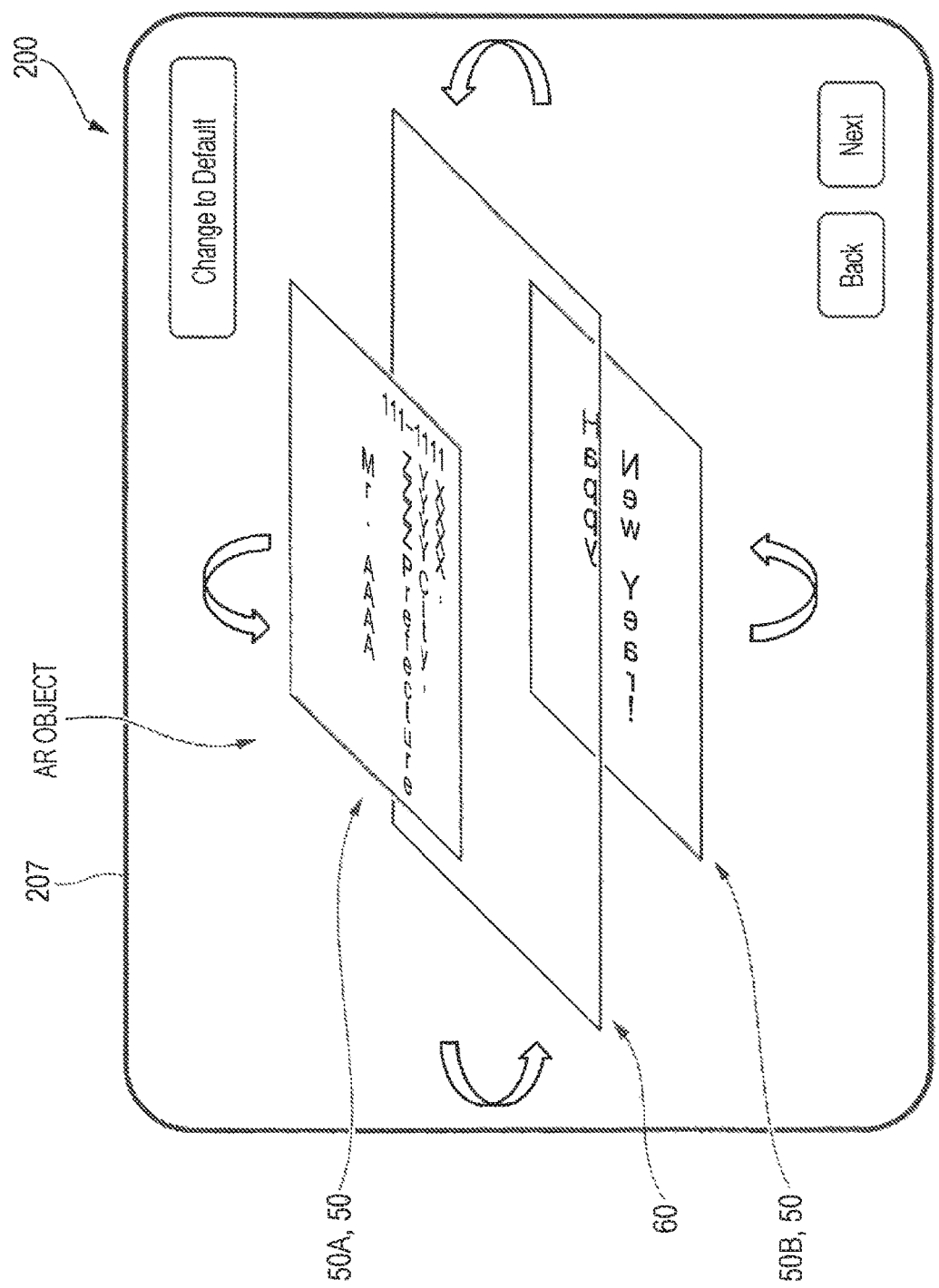

DISPLAY SYSTEM, CONTROL DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-160218 filed Aug. 17, 2016.

BACKGROUND

(i) Technical Field

The present invention relates to display systems, control devices, and non-transitory computer readable media.

(ii) Related Art

For example, a sheet (preprinted sheet) (recording medium) having a special pattern printed in advance, such as a ticket, is used to perform a print job in some cases. In such a print job, in some cases, up, down, left, and right directions, the front, the rear, and the like of the sheet are not uniquely specified, and an operator judges how to print information on the preprinted sheet and thus determines the orientation of the preprinted sheet to be fed.

If a recording medium such as recording paper is placed in a recording medium container in a wrong orientation, an image might be formed on the recording medium in an orientation different from an intended orientation.

SUMMARY

According to an aspect of the invention, there is provided a display system including a display apparatus, at least one recording medium container, and a display controller. The display apparatus includes a display that displays an image. The display apparatus enables a user to see an object by using the display apparatus. The object is actually located on a line extending from a line of sight of the user. The at least one recording medium container accommodates a recording medium on which an image is to be formed. The display controller displays, on the display, information regarding an intended image that is an image to be formed on the recording medium to be placed in the recording medium container. The display controller displays the information when the user looks at the recording medium container by using the display apparatus.

BRIEF DESCRIPTION OF THE DRAWINGS

An exemplary embodiment of the present invention will be described in detail based on the following figures, wherein:

FIG. 8 is a diagram illustrating another example displayed on the AR display apparatus;

DETAILED DESCRIPTION

Hereinafter, an exemplary embodiment of the invention will be described in detail with reference to the attached drawings.

Figure 1:
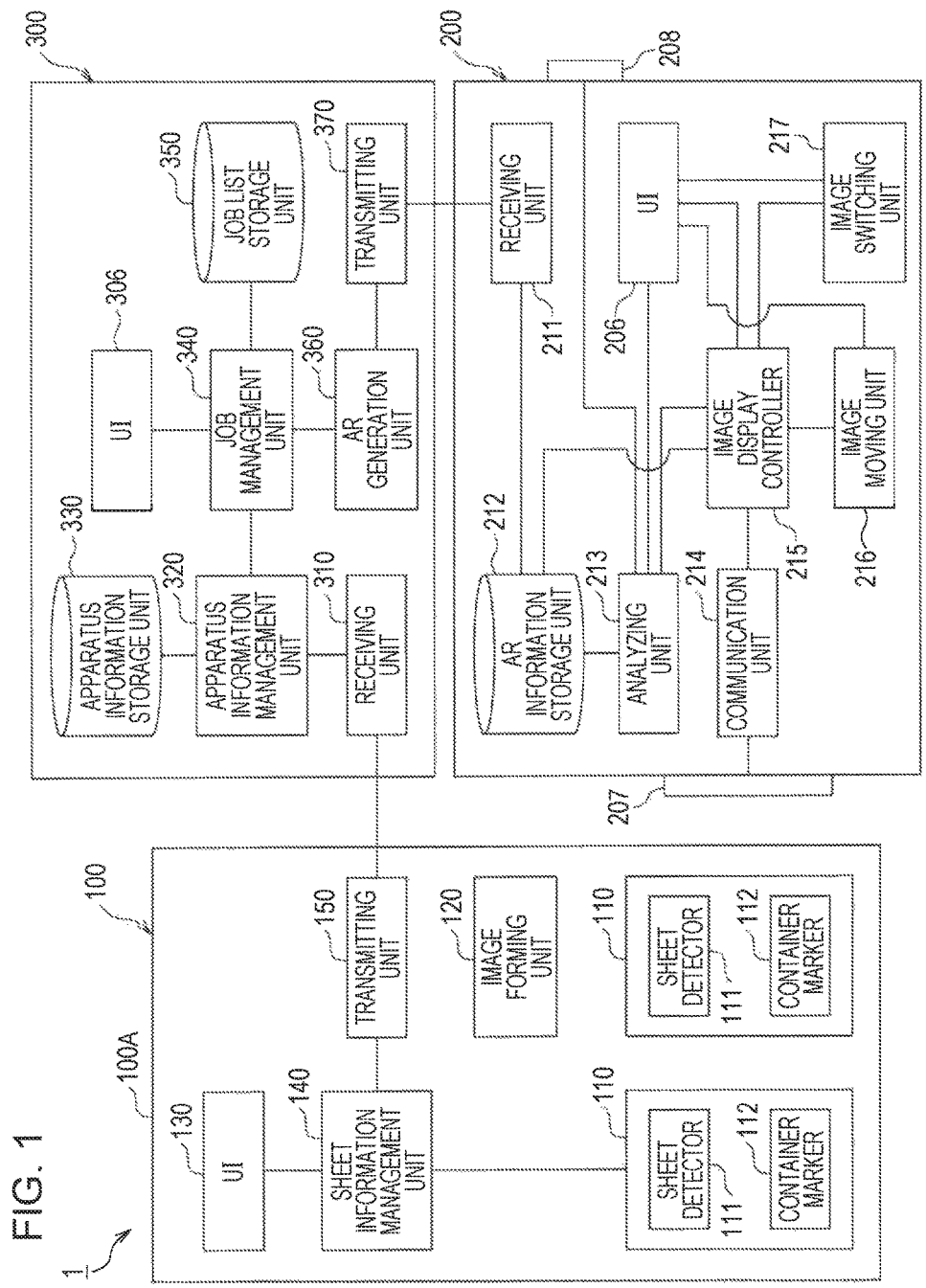
FIG. 1 is a diagram illustrating the overall configuration of a display system.

FIG. 1 is a diagram illustrating the overall configuration of a display system 1 of the exemplary embodiment.

The display system 1 of the exemplary embodiment includes an image forming apparatus 100 that forms an image on a sheet that is a recording medium, an augmented reality (AR) display apparatus 200 that is an example of a display apparatus that displays information to a user, and an information processing apparatus 300 connected to the image forming apparatus 100 and the AR display apparatus 200.

The image forming apparatus 100 includes multiple sheet containers 110 that are each an example of a recording medium container. Each sheet container 110 accommodates at least one paper sheet that is an example of a recording medium.

The sheet container 110 is movably installed. With respect to FIG. 1, when being pulled toward the viewer, the sheet container 110 may be drawn out from a body 100A of the image forming apparatus 100.

The sheet container 110 includes a sheet detector 111 that detects a sheet. The sheet container 110 has a container marker 112 for identifying the sheet container 110.

In the exemplary embodiment, the AR display apparatus 200 detects the container marker 112 to identify the corresponding sheet container 110 (described later in detail).

The image forming apparatus 100 also includes an image forming unit 120, a UI 130, a sheet information management unit 140, and a transmitting unit 150.

The image forming unit 120 forms an image on a sheet transported from the sheet container 110. More specifically, the image forming unit 120 forms an image on a sheet by using a so-called electrophotographic system or an inkjet system.

The UI 130 includes a touch panel and other components. The UI 130 performs displaying of information regarding a sheet to be placed in each sheet container 110, receiving of information regarding the sheet from the user, and the like.

The sheet information management unit 140 manages the information regarding the sheet to be placed in each sheet container 110. The sheet information management unit 140 displays the managed information by using the UI 130. Further, the sheet information management unit 140 receives the details of settings performed using the UI 130 by the user and associates the setting details with the sheet container 110.

The transmitting unit 150 transmits the information associated with the sheet container 110 to the information processing apparatus 300. Further, when the information associated with the sheet container 110 is changed in accordance with, for example, a setting operation performed by the user, the transmitting unit 150 transmits the changed information to the information processing apparatus 300.

The information processing apparatus 300 includes a receiving unit 310, an apparatus information management unit 320, an apparatus information storage unit 330, a job management unit 340, a UI 306, a job list storage unit 350, an AR generation unit 360, and a transmitting unit 370.

The information processing apparatus 300 is configured by using, for example, a personal computer (PC) or a server apparatus.

The receiving unit 310 receives information transmitted from the image forming apparatus 100.

The apparatus information management unit 320 manages information regarding the image forming apparatus 100 transmitted from the image forming apparatus 100. The apparatus information management unit 320 also provides the job management unit 340 with information as necessary.

The job management unit 340 manages a print job given from the user. More specifically, in the exemplary embodiment, to cause the image forming apparatus 100 to perform printing, a PC or the like of the user transmits a print job to the information processing apparatus 300. The job management unit 340 holds and manages the transmitted print job.

The job management unit 340 transmits the print job to the image forming apparatus 100 to cause the image forming apparatus 100 to perform printing. In the exemplary embodiment, the job management unit 340 further delivers the information regarding the print job to the AR generation unit 360.

The UI 306 includes a touch panel, a keyboard, and other components and displays a screen for receiving settings for a print job from the user. The UI 306 also receives, from the user, information for identifying a print job for generating an AR object.

The AR generation unit 360 generates the AR object on the basis of the print job for generating the AR object instructed from the user. The AR generation unit 360 delivers the generated AR object to the transmitting unit 370. The transmitting unit 370 transmits the AR object to the AR display apparatus 200.

The AR display apparatus 200 will be described.

The AR display apparatus 200 that is an example of a display apparatus is configured by using a mobile terminal and is thus a portable device. The AR display apparatus 200 includes a camera 208 that includes a charge-coupled device (CCD) and other components. The camera 208 that is an example of an imaging unit obtains an image by taking an image of an area around the AR display apparatus 200.

The AR display apparatus 200 also includes a display 207 that is an example of a display. An image is displayed on the display 207.

In the exemplary embodiment, an image taken by the camera 208 is displayed on the display 207.

In the exemplary embodiment as to be described later, when the user looks at one of the sheet containers 110 by using the AR display apparatus 200, the AR display apparatus 200 displays a composite image in which a taken image of the sheet container 110 (image taken by the camera 208) (real space image) is combined with another image (an AR object generated by the AR generation unit 360 (generated image)).

In other words, in the exemplary embodiment, a composite image is generated by combining a real space image (taken image) with an AR object, and the composite image is displayed on the display 207 of the AR display apparatus 200. In the exemplary embodiment, the user sees the composite image on the display 207, that is, an AR space.

As a further explanation, in the exemplary embodiment, the user is provided with an AR space in which an image (an AR object generated by the AR generation unit 360) is added to a taken image of the sheet container 110 (real space image) and sees the AR space. Note that the term real space denotes a space existing in reality, and the term AR space denotes a space obtained by combining an artificially generated image with the real space.

As still a further explanation, in the exemplary embodiment, the AR display apparatus 200 enables the user to see an object located on a line extending from a line of sight of the user. More specifically, when the user looks at the display 207 disposed on the AR display apparatus 200, an object intended to be seen by the user and actually located behind the AR display apparatus 200 (the display 207) is displayed (the image of the object taken by the camera 208 is displayed) on the display 207. This enables the user to see the object behind the AR display apparatus 200 (the object located on the line extending from the user's line of sight).

Note that an AR display apparatus 200 that displays an image on an optically transparent display 207 may also be used.

In this case, the user sees the real space through the optically transparent display 207. In other words, in this case, the user looks at the display 207 from the front of the display 207 and thus sees the real space behind the display 207 through the display 207. As an additional explanation, the user in this case sees the object located on the line extending from the user's line of sight through the optically transparent display 207. Further, the user sees an AR object displayed on the display 207 together with the real space (the object) at this time.

A head-mounted AR display apparatus that is a dedicated apparatus may be used as the AR display apparatus 200. A tablet terminal, a smartphone, or another apparatus may also be used to configure the AR display apparatus 200.

As illustrated in FIG. 1, the AR display apparatus 200 further includes a receiving unit 211, an AR information storage unit 212, an analyzing unit 213, and a UI 206. The AR display apparatus 200 also includes the display 207 and the camera 208 as described above.

The AR display apparatus 200 further includes a communication unit 214, an image display controller 215, an image moving unit 216, and an image switching unit 217.

The receiving unit 211 receives the AR object generated by the information processing apparatus 300. The received AR object is stored in the AR information storage unit 212.

The analyzing unit 213 analyzes the taken image obtained by the camera 208 and recognizes the container marker 112 provided on the corresponding sheet container 110. In the exemplary embodiment, if an AR object corresponding to the identified container marker 112 is stored in the AR information storage unit 212, the AR object is displayed on the display 207 that is an image display.

The UI 206 includes a touch panel and other components and receives a user operation performed on the AR display apparatus 200 from the user.

The communication unit 214 communicates with the display 207 of the AR display apparatus 200. Specifically, the communication unit 214 outputs, to the display 207, control information (control information for displaying an AR object on the display 207) from the image display controller 215. The AR object is thereby displayed on the display 207.

The image display controller 215 that is an example of a display controller performs display control on the display 207 through the communication unit 214 and displays, on the display 207, the AR object stored in the AR information storage unit 212.

In the exemplary embodiment, the communication unit 214 and the image display controller 215 may be regarded as a control device that controls displaying on the display 207 of the AR display apparatus 200.

The image moving unit 216 that is an example of a moving unit rotates and moves the AR object on the display 207 in accordance with an instruction given by the user with the UI 206 of the AR display apparatus 200.

Specifically, if the user gives an instruction for rotating or moving the AR object, the image moving unit 216 outputs, to the image display controller 215, a control signal indicating rotation or moving of the AR object. In response to this, the image display controller 215 rotates or moves the AR object.

The image switching unit 217 that is an example of a switching unit switches an AR object displayed on the display 207 to a different AR object.

Specifically, the image switching unit 217 outputs, to the image display controller 215, a control signal indicating switching from the AR object to the different AR object. In response to this, the image display controller 215 switches the AR object displayed on the display 207 to the different AR object.

Specifically, in the exemplary embodiment, if a print job for images to be respectively formed on multiple pages is set, the AR generation unit 360 generates AR objects for the multiple pages, and the AR information storage unit 212 of the AR display apparatus 200 stores therein the AR objects for the multiple pages.

In the exemplary embodiment, when the user gives an instruction for changing the page to a different page with the UI 206 of the AR display apparatus 200, the image switching unit 217 outputs, to the image display controller 215, a control signal indicating switching of the AR object to another. In response to this, the image display controller 215 reads an AR object for the different page from the AR information storage unit 212 and displays the read AR object on the display 207.

Figure 2:
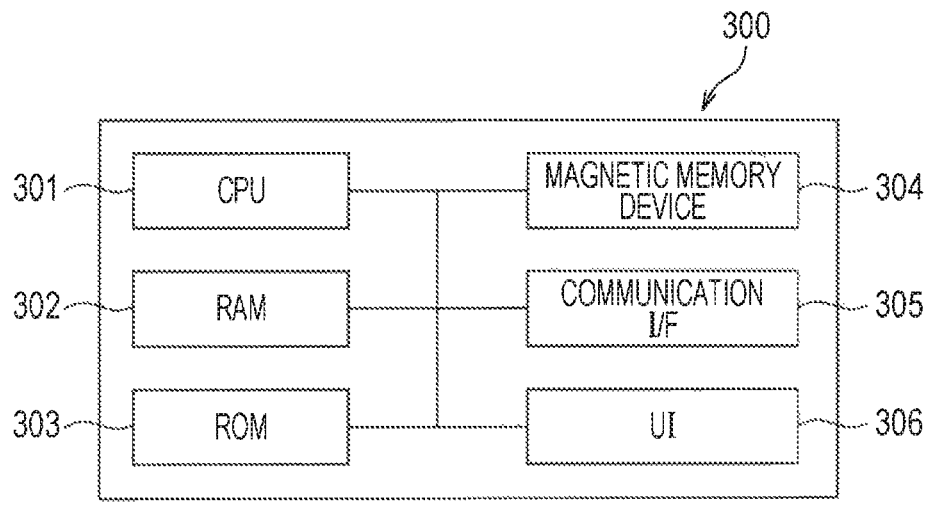
FIG. 2 is a diagram illustrating the configuration of the hardware of an information processing apparatus.

FIG. 2 is a diagram illustrating the configuration of the hardware of the information processing apparatus 300.

As illustrated in FIG. 2, the information processing apparatus 300 includes a central processing unit (CPU) 301, a random access memory (RAM) 302, a read only memory (ROM) 303, and a magnetic memory device 304. The information processing apparatus 300 further includes a communication interface (I/F) 305 for communicating with an external device and the UI 306 including the touch panel, the keyboard, and other components.

The ROM 303 and the magnetic memory device 304 store programs to be run by the CPU 301. The CPU 301 reads a program stored in the ROM 303 or the magnetic memory device 304 and runs the program with the RAM 302 used as a work area.

The CPU 301 runs the programs stored in the ROM 303 and the magnetic memory device 304, and the information processing apparatus 300 thereby functions as the receiving unit 310, the apparatus information management unit 320, the job management unit 340, the AR generation unit 360, and the transmitting unit 370, as illustrated in FIG. 1. The apparatus information storage unit 330 and the job list storage unit 350 included in the information processing apparatus 300 are implemented by the magnetic memory device 304 illustrated in FIG. 2.

The programs run by the CPU 301 may be provided to the information processing apparatus 300 in such a manner as to be stored in a computer-readable recording medium such as a magnetic recording medium (e.g., a magnetic tape or a magnetic disk), an optical recording medium (e.g., an optical disk), a magneto-optical recording medium, or a semiconductor memory. The programs run by the CPU 301 may be downloaded to the information processing apparatus 300 through a communication medium such as the Internet.

Figure 3:
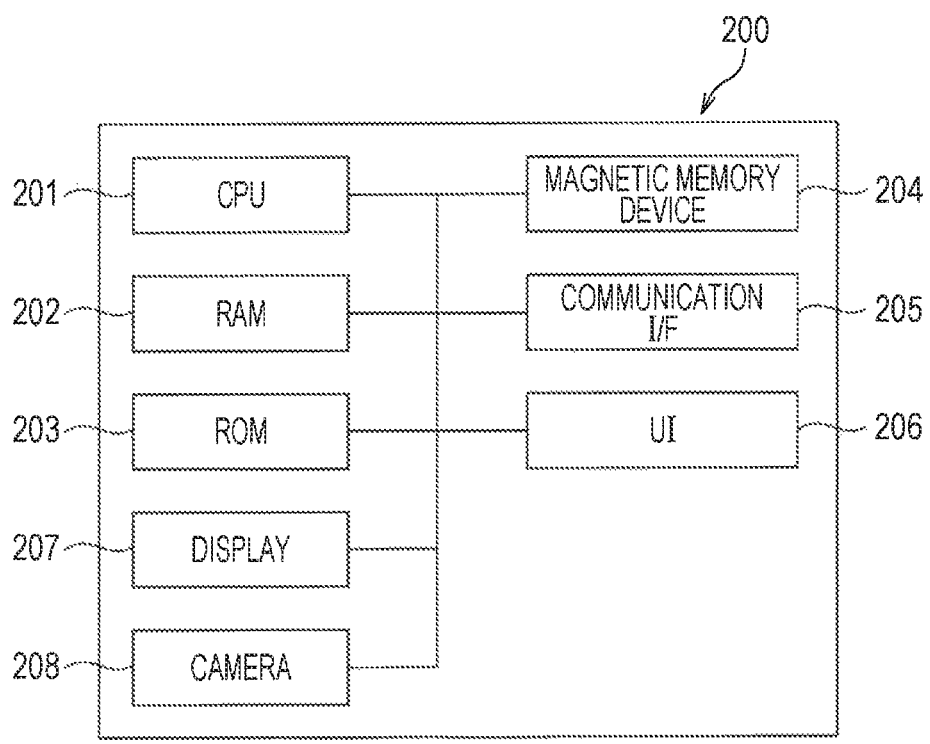
FIG. 3 is a diagram illustrating the configuration of the hardware of an AR display apparatus.

FIG. 3 is a diagram illustrating the configuration of the hardware of the AR display apparatus 200.

As illustrated in FIG. 3, the AR display apparatus 200 includes a CPU 201, a RAM 202, a ROM 203, and a magnetic memory device 204. The AR display apparatus 200 further includes a communication I/F 205 for communicating with an external device, the UI 206, the display 207, and the camera 208.

The ROM 203 and the magnetic memory device 204 store therein programs to be run by the CPU 201. The CPU 201 reads a program stored in the ROM 203 or the magnetic memory device 204 and runs the program with the RAM 202 used as a work area.

The CPU 201 runs the programs stored in the ROM 203 and the magnetic memory device 204, and the functional units that are the receiving unit 211, the analyzing unit 213, the communication unit 214, the image display controller 215, the image moving unit 216, and the image switching unit 217 that are illustrated in FIG. 1 are thereby implemented in the AR display apparatus 200. The AR information storage unit 212 illustrated in FIG. 1 is implemented by the magnetic memory device 204 illustrated in FIG. 3.

The programs run by the CPU 201 may be provided to the AR display apparatus 200 in such a manner as to be stored in a computer-readable recording medium such as a magnetic recording medium (e.g., a magnetic tape or a magnetic disk), an optical recording medium (e.g., an optical disk), a magneto-optical recording medium, or a semiconductor memory. The programs run by the CPU 201 may be downloaded to the AR display apparatus 200 through the communication medium such as the Internet.

Figure 4:
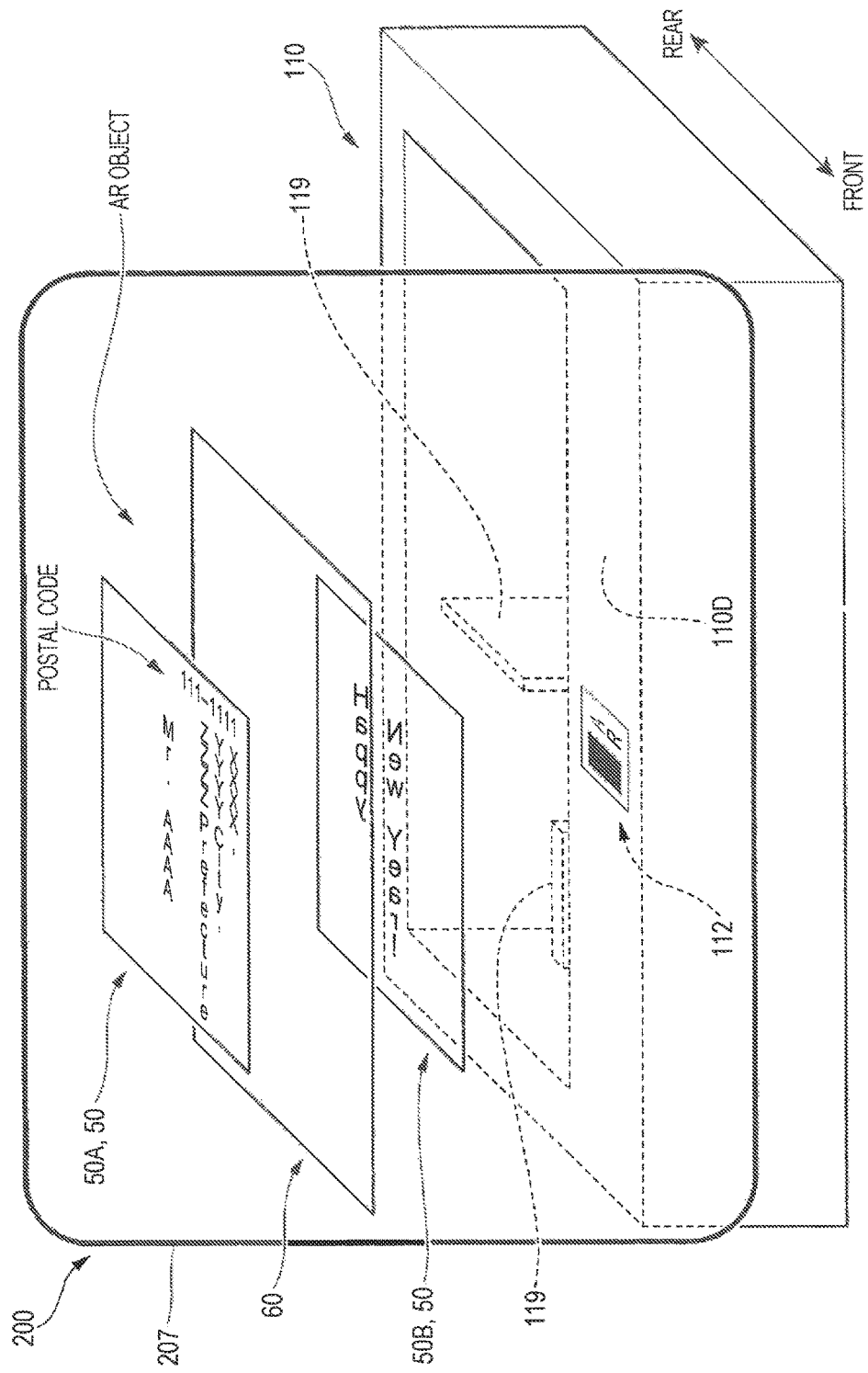
FIG. 4 is a diagram illustrating an AR object displayed on a display of the AR display apparatus.

FIG. 4 is a diagram illustrating an AR object displayed on the display 207 of the AR display apparatus 200.

In the exemplary embodiment, when the user looks at any one of the sheet containers 110 by using the AR display apparatus 200, the sheet container 110 and the AR object are displayed on the display 207 of the AR display apparatus 200.

More specifically, when the user draws out any one of the sheet containers 110 from the body 100A of the image forming apparatus 100 (see FIG. 1) and further looks at the sheet container 110 displayed on the display 207, the AR object illustrated in FIG. 4 is displayed. In other words, when the user looks at the display 207 with the sheet container 110 located behind the display 207, not only the sheet container 110 but also the AR object is displayed on the display 207.

Each sheet container 110 is provided with the corresponding container marker 112 as illustrated in FIG. 4. The container marker 112 is, for example, a code image such as a two-dimensional bar code. In the following description, the container marker 112 is used to obtain information for identifying the location of the sheet container 110 to accommodate a sheet to be used by the user. However, the material used for identifying the location is not limited to the marker, and, for example, a radio transmitter may be used as described later.

In the exemplary embodiment, the container marker 112 is disposed on a frame 110D of the sheet container 110 on a portion close to the front of the image forming apparatus 100, as illustrated in FIG. 4.

In the exemplary embodiment, when the sheet container 110 is drawn out from the body 100A of the image forming apparatus 100, the container marker 112 appears. When the sheet container 110 is pushed into the body 100A to the original position, the container marker 112 is hidden.

Note that the location of the container marker 112 is not particularly limited thereto, and the container marker 112 may be disposed at any different location. The container marker 112 may also be detachable from the sheet container 110 to enable the user to freely replace the container marker 112 with a new one. The container marker 112 may be disposed in a location where the container marker 112 is visible even though the user does not draw out the sheet container 110.

In the exemplary embodiment, as illustrated in FIG. 4, when the user looks at the drawn out sheet container 110 by using the AR display apparatus 200, an image to be formed (hereinafter, referred to as an intended image) on a sheet to be placed in the sheet container 110 is displayed as an AR object.

Specifically, the image display controller 215 (see FIG. 1) reads an AR object for an intended image from the AR information storage unit 212 and displays an image based on the AR object on the display 207.

This enables the user to determine how to orient the sheet to be placed in the sheet container 110 (described in detail later).

Figure 5A:
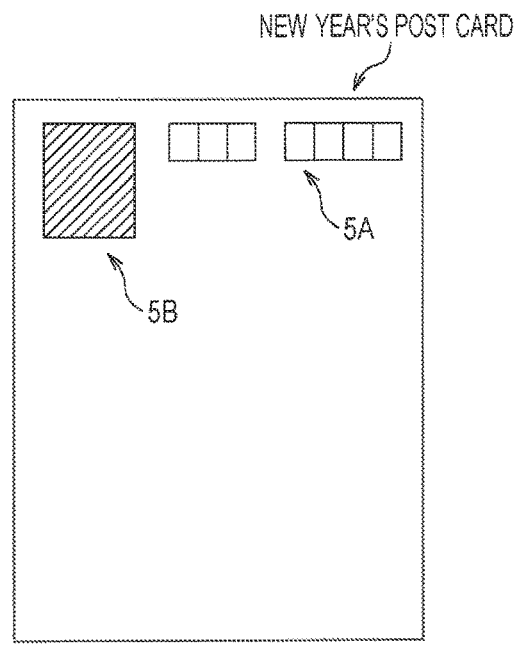
FIG. 5A is a diagram illustrating a sheet to be placed in a sheet container.
Figure 5B:
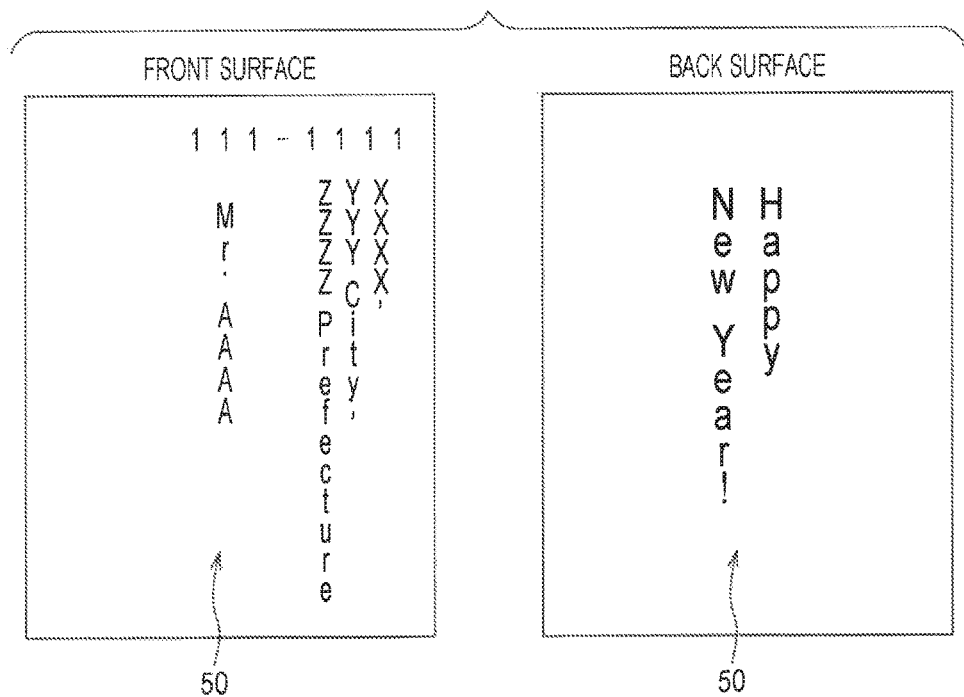
FIG. 5B is a diagram illustrating images to be formed.

FIG. 5A is a diagram illustrating a sheet to be placed in the sheet container 110, and FIG. 5B is a diagram illustrating intended images.

In this example, a New Year's postcard as illustrated in FIG. 5A is to be placed in the sheet container 110. New Year's postcards are each a so-called preprinted sheet and have a postal code field 5A and an image 5B indicating the location for a postage stamp that are printed on the New Year's postcards.

For example, the images as illustrated in FIG. 5B (hereinafter, referred to as intended images 50) are formed on each New Year's postcard.

Each intended image 50 is readable in a predetermined direction. To form the intended image 50 on the New Year's postcard, the New Year's postcard is oriented in the same direction as the intended image 50 and then placed in the sheet container 110.

In the exemplary embodiment, as illustrated in FIG. 4, the AR object representing the intended images 50 located above the sheet container 110 drawn out is displayed.

More specifically, in the exemplary embodiment, when the user looks at the sheet container 110 by using the AR display apparatus 200, the intended images 50 that are images to be formed on the New Year's postcard are displayed on the display 207 of the AR display apparatus 200.

As illustrated in FIG. 4, the two intended images are displayed as the intended images 50 in the exemplary embodiment.

Specifically, the image display controller 215 displays an intended first-surface image 50A that is an image to be formed on a first surface (front surface) of the sheet and an intended second-surface image 50B that is an image to be formed on a second surface (back surface) of the sheet.

Note that the intended first-surface image 50A and the intended second-surface image 50B are generated by the AR generation unit 360 of the information processing apparatus 300 (see FIG. 1). More specifically, the intended first-surface image 50A and the intended second-surface image 50B are generated by rasterizing printing data included in a print job.

Further, in the exemplary embodiment, the AR generation unit 360 also generates a sheet image 60 (image representing a sheet) that is an example of a recording medium image. As illustrated in FIG. 4, the sheet image 60 is also displayed between the intended first-surface image 50A and the intended second-surface image 50B.

In the exemplary embodiment, when looking at the sheet container 110 by using the AR display apparatus 200, the user sees not only the sheet container 110 existing in the real space but also the intended first-surface image 50A, the intended second-surface image 50B, and the sheet image 60 that are the AR objects.

The user refers to these images and then sets the New Year's postcard in the sheet container 110.

The user refers to the intended first-surface image 50A and the intended second-surface image 50B and thereby determines the orientation of the New Year's postcard to be set in the sheet container 110.

Specifically, the user refers to, for example, the location of a postal code in the intended first-surface image 50A and the orientation of characters in the intended first-surface image 50A and the intended second-surface image 50B and thereby determines the orientation of the New Year's postcard to be set.

Further, the user refers to the intended first-surface image 50A and the intended second-surface image 50B and thereby determines which direction the front and back surfaces of the New Year's postcard to be set are to face.

In this example, the intended first-surface image 50A includes the postal code, and the user sets the New Year's postcard such that the surface on which the postal code field 5A of the New Year's postcard is printed faces upward (see FIG. 5A).

In the exemplary embodiment, the user orients the New Year's postcard such that the orientation of the New Year's postcard and the orientation of the intended image 50 match and the content of the front and back surfaces of New Year's postcard and the content of the intended image 50 match. The user thereafter places the New Year's postcard in the sheet container 110.

More specifically, as illustrated in FIG. 4, the sheet container 110 includes a guide member 119 used for positioning the New Year's postcard. The user places the New Year's postcard within the region defined by the guide member 119.

Note that displaying of the two intended images 50 that are the intended first-surface image 50A and the intended second-surface image 50B has been described, but the number of the intended images 50 is not limited to two. Only one intended image 50 that is one of the intended first-surface image 50A and the intended second-surface image 50B may be displayed.

In addition, the case where the sheet image 60 is displayed has been described, but the sheet image 60 does not have to be displayed.

To generate the sheet image 60, the ratio of the length to the width of the sheet image 60 preferably corresponds to the ratio of the length to the width of a sheet to be actually used.

To display each intended image 50 and the sheet image 60, the positional relationship between the intended image 50 and the sheet image 60 preferably corresponds to the positional relationship in printing to be actually performed.

Further, to display the intended image 50 above the sheet container 110 in the exemplary embodiment, settings and the like performed by the user are taken into consideration.

More specifically, in some settings and the like performed by the user, an image to be formed on the sheet is rotated by 90 degrees or 180 degrees, or the sheet is turned over in the course of transportation in the image forming apparatus 100. In the exemplary embodiment, the intended image 50 is generated with these settings taken into consideration and is then displayed above the sheet container 110.

In the exemplary embodiment, assume a case where a sheet in the sheet container 110 has the intended image 50 that is displayed above the sheet container 110 and that is fixed (formed) on the sheet and where the sheet having the intended image 50 fixed thereon is transported to the image forming unit 120. In the image forming unit 120, the orientation of the intended image 50 fixed on the sheet in the sheet container 110 corresponds to the orientation of an image to be actually formed in the image forming unit 120.

In other words, in the exemplary embodiment, assume a case where a sheet having an image formed thereon by the image forming unit 120 (hereinafter, referred to as an image-formed sheet) is transported from the image forming unit 120 back to the sheet container 110 along the sheet transport path. In the sheet container 110, the orientation of the intended image 50 above the sheet container 110 corresponds to the orientation of the image on the image-formed sheet.

In the exemplary embodiment, if the sheet is placed in the sheet container 110 in the same orientation as the intended image 50, the orientation of an image already formed on the sheet corresponds to the orientation of an image to be actually formed by the image forming unit 120.

Note that after an image is formed on a sheet, another image is formed on the sheet in some cases. For example, an address or the like is later printed on a New Year's postcard.

In other cases, to increase the thickness of the image to be formed and give a three-dimensional effect thereto, images of the same shape are layered on a recording medium.

In such cases, unlike a general blank sheet, a sheet on which an image is formed in first printing (hereinafter, also referred to as a printed sheet) is set in the sheet container 110. Further, in this case, to orient the printed sheet in the same direction as an intended image 50 for second printing, the printed sheet needs to be rotated or turned over and thereafter set in the sheet container 110.

In the exemplary embodiment as described above, when the user looks at the sheet container 110 by using the AR display apparatus 200, the intended image 50 is displayed on the display 207 of the AR display apparatus 200.

This enables the user to determine the state of the intended image 50 to be formed on a sheet to be set. In this case, the user orients the sheet to be set and thereafter sets the sheet. This prevents the sheet from being set in the wrong orientation.

In another conceivable method for preventing a sheet from being set in the wrong orientation, an image already formed on a printed sheet actually set in the sheet container 110 (image on a sheet having undergone first printing) is obtained by performing scanning or the like, and a composite image including the obtained image superposed on the intended image 50 is displayed on the UI 130 or the like of the image forming apparatus 100 (see FIG. 1). In this case, the user checks the image on the UI 130 to verify whether the sheet has been set in the same orientation as the intended image 50.

However, it is difficult in some cases to distinguish upper, lower, right, and left parts of an image formed on a printed sheet at a glance. In the case where the image of the printed sheet is displayed on the UI 130 as described above, it is likely to be difficult to distinguish the orientation of the printed sheet and also difficult to determine whether the printed sheet has been oriented in the same direction as the intended image 50. In this case, the printed sheet is likely to be set incorrectly.

In contrast, in the exemplary embodiment, the user visually checks the actual printed sheet to determine the orientation of the printed sheet. In this case, as described above, the printed sheet is less likely to be incorrectly set than in the case where the user determines the orientation of the printed sheet by using the UI 130.

Figure 6:
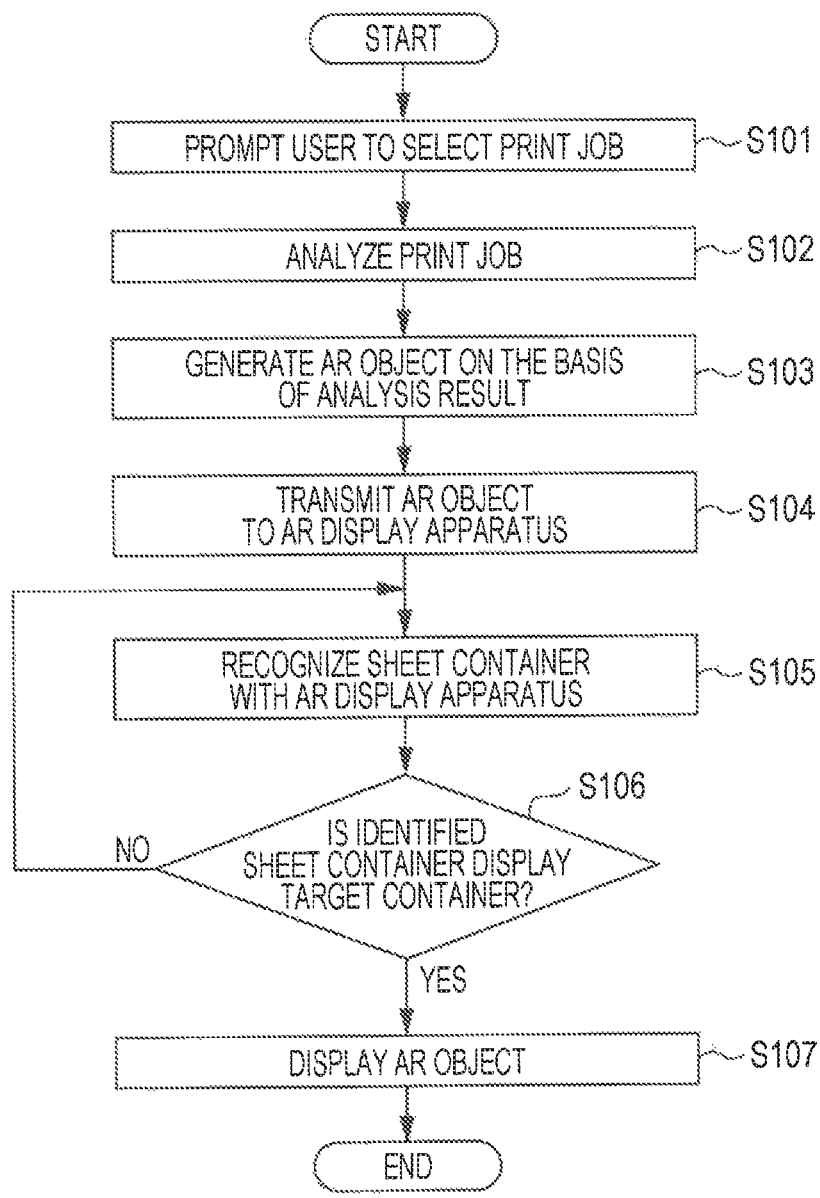
FIG. 6 is a flowchart explaining a process to be executed by the display system.

FIG. 6 is a flowchart explaining a process to be executed by the display system 1 of the exemplary embodiment.

In the exemplary embodiment, a print job list stored in the job list storage unit 350 of the information processing apparatus 300 is first displayed on the UI 306 of the information processing apparatus 300 (see FIG. 1).

Next, the user operates the UI 306. The user selects a print job to be performed for a printing process from the print job list (step S101) and registers the print job as an object to be displayed by the AR display apparatus 200.

Figure 7:
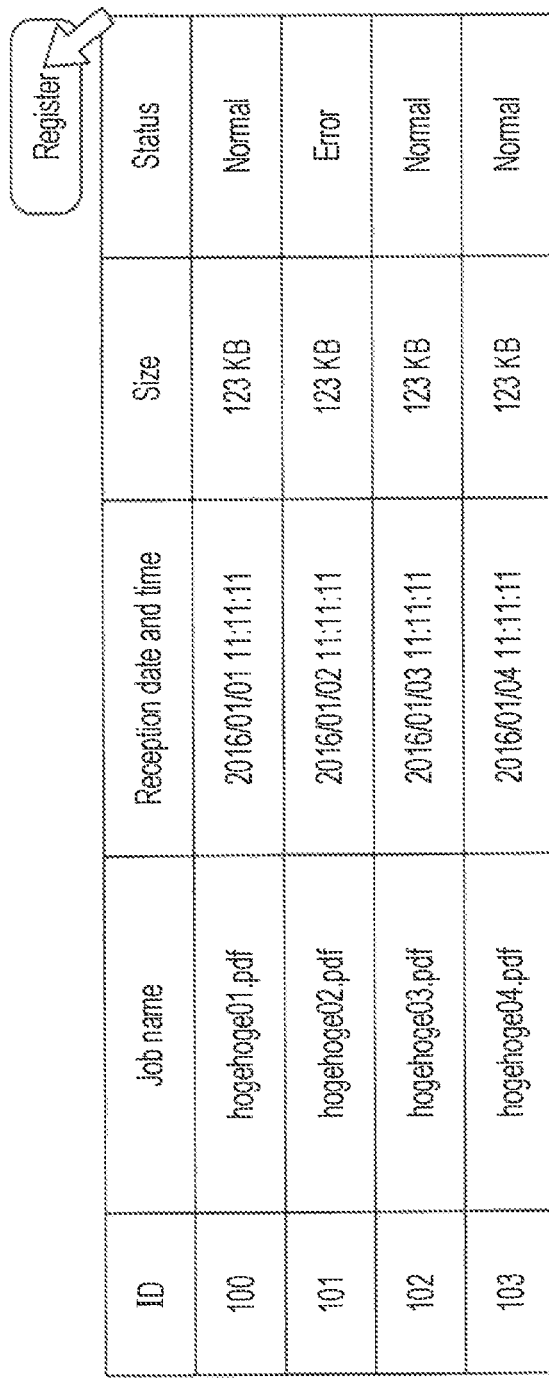
FIG. 7 is a diagram illustrating a print job list displayed on a user interface (UI) of the information processing apparatus.

FIG. 7 is a diagram illustrating a print job list displayed on the UI 306 of the information processing apparatus 300.

The user selects a print job from the list illustrated in FIG. 7. Further, the user registers the selected print job as an object to be displayed by the AR display apparatus 200.

Specifically, the user presses the "Register" button in the upper right part of FIG. 7 and thereby registers the selected print job as the object to be displayed by the AR display apparatus 200.

The case where the print job is registered by pressing the Register button has been described for the exemplary embodiment. However, in another case, a menu displayed by right-clicking the mouse may have a "Register" item. The print job may be registered by selecting the "Register" item.

The print job may also be registered by using the UI 130 of the image forming apparatus 100 or the UI 206 of the AR display apparatus 200.

After the print job is registered, the AR generation unit 360 of the information processing apparatus 300 analyzes the registered print job (step S102).

The AR generation unit 360 functioning as a generation unit generates an AR object (generates an image to be displayed by the AR display apparatus 200) on the basis of the result of the analysis (step S103).

In the analysis process in step S102, the AR generation unit 360 analyzes information regarding printing data, the sheet transport path, the sheet container 110, the sheet information, the orientation of a document, whether to orient the document, whether to perform duplex printing, an imposition method, a surface to face upwards in discharging, a sheet discharge unit, whether to perform finishing (a post-process), and the like. In analyzing the sheet information, information such as the sheet size, the orientation of a sheet to be fed, a sheet type, whether to perform punching, color, and weight is analyzed.

The AR generation unit 360 generates the AR object in step S103 on the basis of the results of analyses of the information.

The orientation of the AR object generated by the AR generation unit 360 is not fixed but is changed in accordance with the analysis results.

More specifically, in accordance with the orientation of the intended image 50 to be actually formed on the sheet by the image forming apparatus 100, the AR generation unit 360 changes the orientation of the image to be generated.

In some cases in the exemplary embodiment, the intended image 50 is actually formed on the sheet after being rotated depending on the settings specified by the user. In such cases, generating the AR object without taking the rotation into consideration causes the sheet to be set in the wrong orientation. In the exemplary embodiment, the AR generation unit 360 thus changes the orientation of the AR object to be generated, in accordance with the orientation of the intended image 50.

For the same reason, the AR generation unit 360 changes the orientation of the AR object to be generated, in accordance with a setting for transporting the sheet from the sheet container 110 to the image forming unit 120.

When the sheet is transported from the sheet container 110 to the image forming unit 120, the sheet is, for example, turned over in some cases. Generating the AR object without taking the turnover into consideration causes the sheet to be set in the wrong orientation. The AR generation unit 360 thus likewise changes the orientation of the AR object to be generated, in accordance with the setting for transporting the sheet.

The AR generation unit 360 also analyzes the print job and determines the sheet container 110 for which the AR object is displayed.

Specifically, the print job includes information regarding the size of a sheet to be used. Based on the size information, the AR generation unit 360 determines the sheet container 110 for which the AR object is displayed.

More specifically, each sheet container 110 of the image forming apparatus 100 is in advance associated with information regarding the size of a sheet to be placed in the sheet container 110. The apparatus information management unit 320 of the information processing apparatus 300 stores relationships between the sheet containers 110 and sheet sizes.

Based on the sheet size information included in a print job and the corresponding relationship stored in the apparatus information storage unit 330, the AR generation unit 360 determines the sheet container 110 for which the AR object is displayed (hereinafter, referred to as a "display target container").

Specifically, for example, if the sheet size information included in the print job is A4 and if one of the sheet containers 110 is in advance set to accommodate an A4 size sheet, the AR generation unit 360 determines this sheet container 110 as the display target container.

The information used for determining the display target container is not limited to the sheet size information. Information regarding the quality of a sheet may be used. In this case, the apparatus information storage unit 330 stores information regarding each sheet container 110 and sheet quality information associated with the sheet container 110. The AR generation unit 360 determines the display target container on the basis of the sheet quality information included in the print job and the information stored in the apparatus information storage unit 330.

The transmitting unit 370 of the information processing apparatus 300 (see FIG. 1) then transmits the AR object generated in step S103 to the AR display apparatus 200 (step S104). Note that information transmitted to the AR display apparatus 200 includes information regarding the display target container.

The user looks at the drawn out sheet container 110 by using the AR display apparatus 200, and the analyzing unit 213 of the AR display apparatus 200 recognizes the sheet container 110 (step S105).

More specifically, the analyzing unit 213 analyzes an image taken by the camera 208 of the AR display apparatus 200 and detects the container marker 112. The sheet container 110 with the container marker 112 is thereby recognized.

In the exemplary embodiment, each sheet container 110 is identified by using the corresponding container marker 112 but may be identified on the basis of the shape of the sheet container 110 (overall or partial shape of the sheet container 110).

In the exemplary embodiment, the analyzing unit 213 thereby judges whether the sheet container 110 looked at by the user by using the AR display apparatus 200 (the sheet container 110 identified on the basis of the container marker 112) is the display target container (the sheet container 110 for which the AR object is to be displayed) (step S106).

If it is judged that the displayed sheet container 110 is the display target container, the image display controller 215 displays the AR object for the display target container on the display 207 of the AR display apparatus 200 (step S107).

In other words, to actually form the intended image 50 on the sheet in the exemplary embodiment, the sheet is fed from one of the multiple sheet containers 110. In the exemplary embodiment, this sheet container 110 serves as the display target container, and the AR object is displayed above the display target container.

If it is judged in step S106 that the displayed sheet container 110 is not the display target container (the user looks at a different one of the sheet containers 110 that is not the display target container), steps S105 and S106 are performed again without displaying the AR object.

In step S105, the analyzing unit 213 of the AR display apparatus 200 recognizes a sheet container 110 as a new one. If it is judged in step S106 that the newly recognized sheet container 110 is the display target container, the AR object is displayed above the new sheet container 110 in step S107.

If it is judged in step S106 that the sheet container 110 looked at by the user by using the AR display apparatus 200 is not the display target container, an alert or the like may be displayed to the user with the AR display apparatus 200.

Specifically, if it is judged that the sheet container 110 looked at by the user by using the AR display apparatus 200 is not the display target container, information indicating that the sheet container 110 looked at by the user is not the display target container may be displayed on the AR display apparatus 200.

In other words, when the user looks at the different sheet container 110 that is not the display target container by using the AR display apparatus 200, information indicating that the sheet container 110 intended to accommodate the sheet is not the different sheet container 110 may be displayed on the AR display apparatus 200.

This increases the possibility that the user looks at the display target container. In other words, the display target container is more likely to be drawn out from the body 100A (see FIG. 1) of the image forming apparatus 100, and the sheet is more likely to be placed in the display target container.

In the exemplary embodiment, the AR object is displayed above the display target container, and the sheet is thus less likely to be placed incorrectly.

In addition, when the user looks at the different sheet container 110 that is not the display target container, an image indicating the location of the display target container may be displayed on the AR display apparatus 200 to notify the user of the location of the display target container.

Before the image indicating the location of the display target container is displayed, the location of the display target container needs to be identified. Specifically, the location is identified on the basis of, for example, the sheet container 110 incorrectly drawn out by the user.

Note that when the image indicating the location of the display target container is displayed, the display target container has not been drawn out from the body 100A. At this time, the container marker 112 on the display target container has not been detected, and the location of the display target container has not been identified. In this case, the location of the display target container is accordingly identified on the basis of, for example, the sheet container 110 incorrectly drawn out by the user.

More specifically, when the display target container has not been drawn out, the location of the display target container is identified on the basis of information regarding a positional relationship stored in advance in the AR information storage unit 212 and the sheet container 110 incorrectly drawn out by the user.

More specifically, for such a case, information regarding the positional relationship between the sheet containers 110 is stored in advance in the AR information storage unit 212.

When the user looks at the different sheet container 110 that is not the display target container, the AR display apparatus 200 determines the location of the display target container on the basis of the information regarding the sheet container 110 (identification information identifying this different sheet container 110) and the positional relationship stored in the AR information storage unit 212.

The AR display apparatus 200 notifies the user of the determined location. Specifically, for example, the AR display apparatus 200 displays, on the display 207, an arrow pointing at the display target container to thereby notify the user of the location of the display target container. Alternatively, the AR display apparatus 200 notifies the user, for example, to "Draw out the sheet container 110 two tiers higher than the current sheet container 110" so that the user will be aware of the location of the display target container.

FIG. 8 is a diagram illustrating another example displayed on the AR display apparatus 200. Note that the real space is not illustrated in FIG. 8.

In the display example as has been described above, the intended second-surface image 50B faces downward and is thus not easy to check.

In contrast, in the example illustrated in FIG. 8, the AR object displayed on the display 207 of the AR display apparatus 200 may be rotated by 360 degrees. More specifically, in this display example, the AR object on the display 207 is rotated in accordance with a rotation instruction from the user.

This enables the user to check the intended second-surface image 50B at an angle different from the original angle. The intended first-surface image 50A and the sheet image 60 may also be seen at a different angle and be thus easily checked.

Note that the case where the AR object is rotated has been described in the exemplary embodiment, but the process for the AR object is not limited to the rotation. The AR object may be moved to a location different from the original location.

A rotation instruction from the user is issued to, for example, the AR display apparatus 200 (see FIG. 1). More specifically, the user gives an instruction for rotating or moving the AR object by operating, for example, a hard key on the AR display apparatus 200 or the display 207 (touch panel).

If the AR display apparatus 200 is capable of recognizing gesture of the user, the user gives the instruction for rotating or moving the AR object by making a predetermined gesture.

The rotation or moving instruction from the user is output to the image moving unit 216 of the AR display apparatus 200 (see FIG. 1), and the image moving unit 216 rotates or moves the AR object on the AR display apparatus 200. More specifically, upon receiving the instruction from the user, the image moving unit 216 outputs the instruction for rotating or moving the AR object to the image display controller 215. In response to this, the image display controller 215 rotates or moves the AR object.

Note that a button for changing the display setting to the default setting is disposed in the upper right part of the display illustrated in FIG. 8. When the user presses this button, the display returns to the state before the AR object is rotated or moved.

The intended image 50 to be actually formed on the sheet is displayed on the AR display apparatus 200 in the description above. However, information obtained from the intended image 50 may be displayed instead of the intended image 50 itself.

Figure 9A:
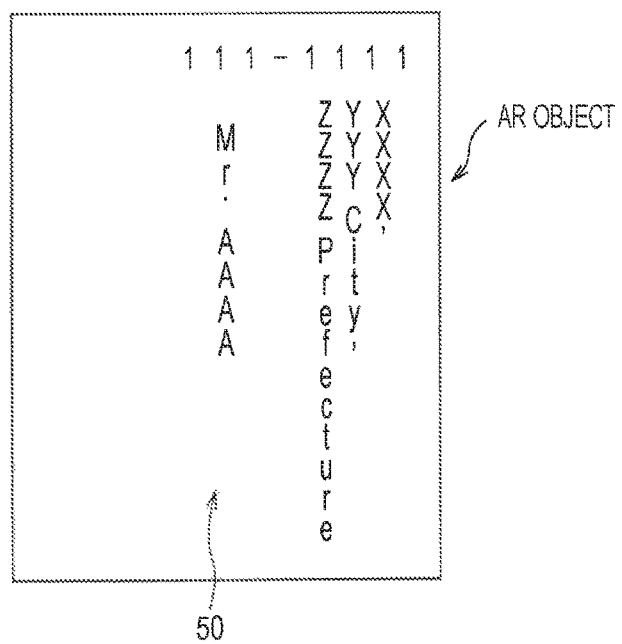
FIGS. 9A and 9B are diagrams respectively illustrating other examples displayed on the AR display apparatus.
Figure 9B:
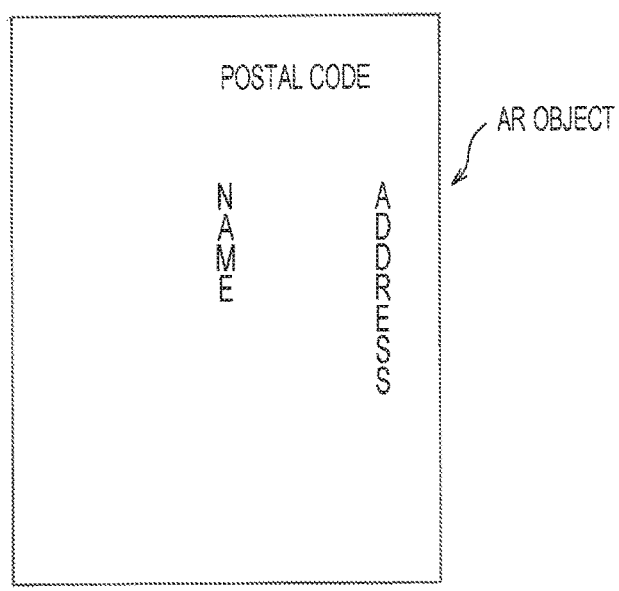

FIGS. 9A and 9B are diagrams respectively illustrating other examples displayed on the AR display apparatus 200.

In the description above, as illustrated in FIG. 9A, each intended image 50 to be actually formed on the sheet is displayed as the AR object to be displayed on the AR display apparatus 200. However, the displayed image is not limited thereto. As illustrated in FIG. 9B, information obtained from the intended image 50 may be displayed.

The AR object illustrated in FIG. 9A includes a specific postal code, a specific address, and a specific name. In contrast, in FIG. 9B, the specific postal code, the specific address, and the specific name are not displayed as the AR object, but what is indicated by each specific piece of information is displayed. In other words, the category of the specific piece of information is displayed.

Also in the display example illustrated in FIG. 9B, when setting a sheet (New Year's postcard) in the sheet container 110, the user refers to the category (the orientation or location predetermined for the category) and thereby determines which direction the sheet is to be oriented.

For example, the intended image 50 itself may be analyzed to determine the category of the information included in the intended image 50.

In addition, for example, each image included in the intended image 50 may include a code image (code image having information regarding the category) such as a two-dimensional bar code (when a print job is generated, a code image such as a two-dimensional bar code is included in the image), and the code image may thus be analyzed to determine the category of the information included in the intended image 50.

Figure 10A:
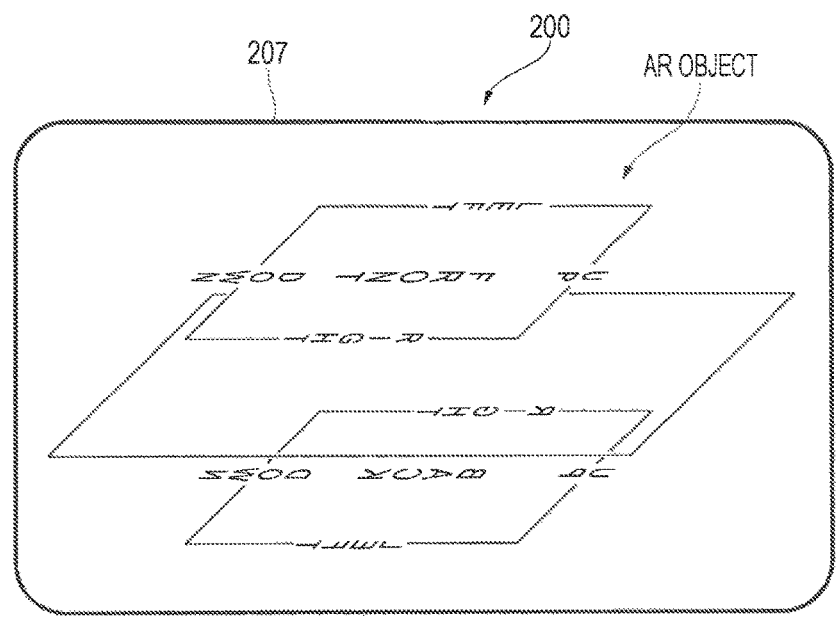
FIGS. 10A and 10B are diagrams respectively illustrating other examples displayed on the AR display apparatus.

Instead of the intended image 50 itself, information indicating the orientation of the intended image 50 may be displayed on the AR display apparatus 200 as illustrated in FIG. 10A (the diagram illustrating another example displayed on the AR display apparatus 200).

Note that the orientation of the intended image 50 needs to be determined before displaying the information. The orientation of the intended image 50 may be determined on the basis of, for example, the orientation of image data included in a print job or, for example, by analyzing the details of the intended image 50.

The display example illustrated in FIG. 10A displays information indicating upper and lower parts of each intended image 50 and information indicating right and left parts thereof.

More specifically, words "UP" and "DOWN" are respectively displayed as the information indicating the upper and lower parts of the intended image 50, and words "RIGHT" and "LEFT" are respectively displayed as the information indicating the right and left parts of the intended image 50.

Although the two pieces of information that are the information indicating the upper and lower parts and the information indicating the right and left parts are displayed in the display example, only one of the pieces of information may be displayed. In addition, although the two words are displayed in each of the two pieces of information, only one of the words may be displayed.

Specifically, for example, the one word "UP" indicating an up direction may be displayed as the information indicating the upper and lower parts. Likewise, the one word "LEFT" indicating a left direction may be displayed as the information indicating the right and left parts.

In the display example illustrated in FIG. 10A, information regarding the front and back surface of a recording medium on which the intended image 50 is to be formed is also displayed as the information indicating the orientation of the intended image 50. Specifically, a word "FRONT" indicating a first surface defined as the front surface and a word "BACK" indicating a second surface defined as the back surface are displayed.

This enables the user to determine which direction a surface of a sheet is to face when the user places the sheet in the sheet container 110.

Further, the display example displays the words "UP", "DOWN", "LEFT", "RIGHT", "FRONT", and "BACK" as the information indicating the orientation of the intended image 50. Since words are readable in a predetermined direction, seeing the orientation of a word enables the user to determine the orientation of the sheet to be set. In this example, a total of six words "UP", "DOWN", "LEFT", "RIGHT", "FRONT", and "BACK" are displayed, but only one of the words may be displayed. This is because the one word is readable in the predetermined direction, and the user is thus able to determine the orientation of the sheet to be set.

Figure 10B:
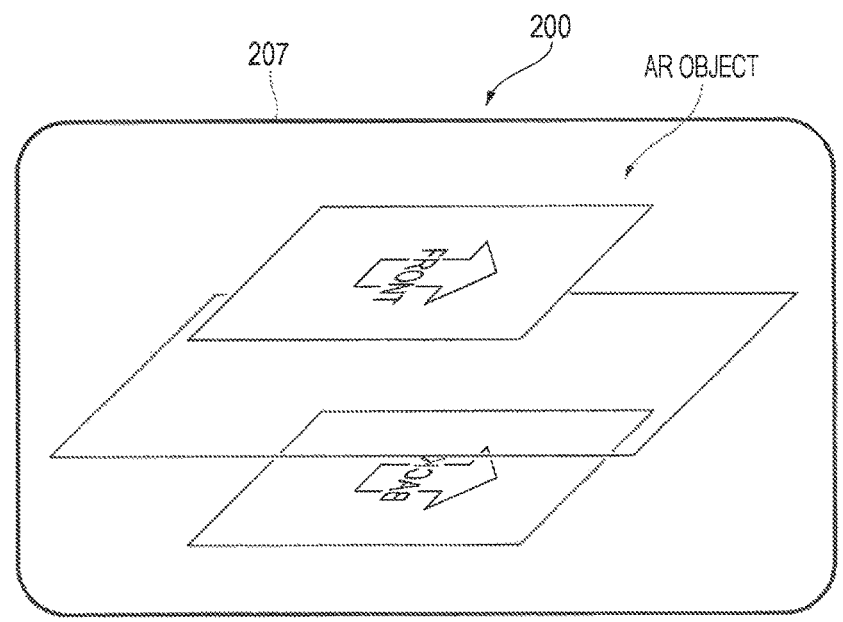

The information indicating the orientation of the intended image 50 is not limited to the words, and figures may be displayed as illustrated in FIG. 10B. In this example, arrows are displayed, and the direction indicated by each arrow is the "UP" direction.

The size of the AR object may be changed.

Specifically, the size of the AR object may be changed in accordance with, for example, the size of the actual sheet for the intended image 50.

More specifically, for example, the AR object is made large for a large sheet and is made small for a small sheet.

For a case where the size of the AR object is changed, multiple types of AR objects corresponding to the respective sizes are in advance stored, for example, in the AR information storage unit 212 of the AR display apparatus 200 (see FIG. 1).

An AR object corresponding to a size for displaying the AR object is read in accordance with the size from the AR information storage unit 212 and is then displayed on the display 207 of the AR display apparatus 200.

The case where the intended images 50 on the first and second pages are displayed has been described as an example. However, switching may be performed from one of the intended images 50 to the other for the corresponding page.

If the intended images 50 are to be respectively formed on multiple pages, the AR generation unit 360 (see FIG. 1) functioning as an image generation unit generates images (AR objects) to be displayed on the multiple pages. Further, the images to be displayed on the multiple pages are stored in the AR information storage unit 212 of the AR display apparatus 200.

When the user gives an instruction for changing the page to a different page, the image switching unit 217 of the AR display apparatus 200 switches the intended image 50 displayed on the AR display apparatus 200 to an intended image 50 for the different page.

As the number of AR objects for the respective pages to be checked by the user is increased, the user may determine the orientation of the AR objects more accurately.

The AR object switching enables the user to check AR objects for the third page and succeeding pages and thus to determine the orientation of the AR objects more accurately than in the case where the AR objects for only the first and second pages are displayed.

Note that the page change instruction from the user is given to, for example, the UI 206 of the AR display apparatus 200. When the user gives the instruction for changing the page to a different page, the image switching unit 217 of the AR display apparatus 200 switches the AR object displayed on the display 207 to an AR object for the different page.

More specifically, when the user gives the page change instruction, the image switching unit 217 instructs the image display controller 215 to change the page. In response to this, the image display controller 215 displays the AR object for the different page in the exemplary embodiment.

In the description above, the intended image 50 is displayed for one of the sheet containers 110 and is not displayed for a different sheet container 110. However, an intended image 50 may be displayed for the different sheet container 110.

Figure 11A:
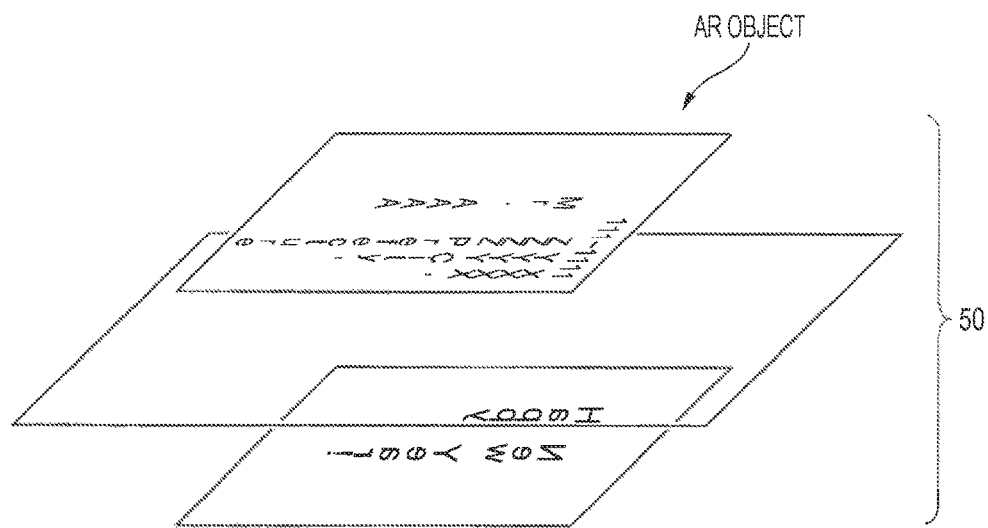
FIGS. 11A and 11B are diagrams respectively illustrating other examples displayed on the AR display apparatus.
Figure 11B:
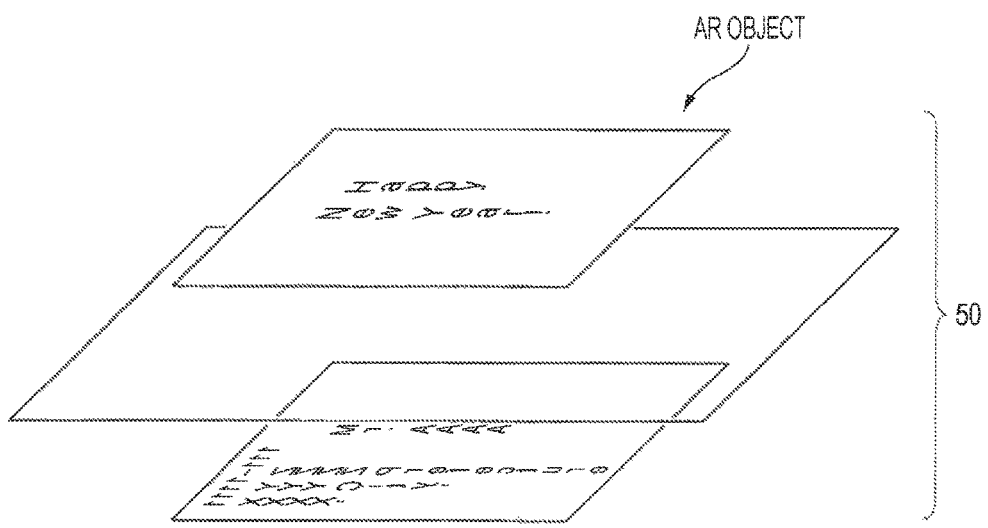

In this case, however, as illustrated in FIGS. 11A and 11B (diagrams illustrating other examples displayed on the AR display apparatus 200), the orientation of the displayed intended image 50 varies with the sheet container 110 in some cases.

FIG. 11A illustrates the intended images 50 for one of the sheet containers 110. In the intended images 50, an image such as a name to be formed on one surface faces upward, and an image to be formed on the other surface faces downward.

In contrast, in a different sheet container 110 as illustrated in FIG. 11B, the image such as a name to be formed on one surface faces downward, and the image to be formed on the other surface faces upward.

In the exemplary embodiment as described above, the AR generation unit 360 changes the orientation of the AR object to be generated, in accordance with the setting for transporting a sheet from a sheet container 110 to the image forming unit 120.

When being transported from the one sheet container 110 or the different sheet container 110 to the image forming unit 120, the sheet is turned over in some cases. In such cases, the orientation of the AR object to be generated is changed, and the orientation of the AR object to be displayed is thus changed in accordance with the sheet container 110.

The number of sheet containers 110 for displaying the intended image 50 is not limited to one. Multiple intended images 50 may be simultaneously displayed for the multiple sheet containers 110, respectively. This enables reduction in wrong placement of sheets of mixed sizes to form images thereon.

For example, to output printed materials of mixed sizes of the A4 size and the A3 size, the intended images 50 are respectively displayed for a sheet container 110 for setting the A4 size sheet and a sheet container 110 for setting the A3 size sheet.

The user may operate the UI 206 of the AR display apparatus 200 to thereby set, as the sheet container 110 to be used for printing, the sheet container 110 recognized by the AR display apparatus 200.

More specifically, for example, if the user performs an operation or the like of, for example, the "Register" button on the AR display apparatus 200 when the AR display apparatus 200 displays the intended image 50 above one of the sheet containers 110, the sheet container 110 may be set as the sheet container 110 to be used for printing.

More specifically, although the cases where an image is displayed above a predetermined one of sheet containers 110 have been described in the examples above, in this process example, the displayed sheet container 110 is not limited to the one sheet container 110. If any one of the sheet containers 110 is drawn out, the intended image 50 is displayed.

The user then refers to the intended image 50 and judges whether the drawn out sheet container 110 is the sheet container 110 to be actually used. If the user judges that the sheet container 110 is the sheet container 110 to be actually used, the user performs the operation of the "Register" button as described above. The sheet container 110 is thereby set as the sheet container 110 to be used for printing.

The intended image 50 includes a blank page in some cases. In such cases, an AR object indicating a blank page is preferably displayed as the intended image 50. This enables wrong setting of a sheet to be reduced further.

Note that sheets for multiple print jobs are placed in the same sheet container 110 in some cases. In such cases, the user may serially change pages as described above to thereby check the intended images 50 to be formed in the respective print jobs.

If a blank page is not displayed in these cases, for example, if the intended images 50 are displayed in succession without any blank page (are moved forward), inconsistency arises in the relationships between each displayed intended image 50 and the corresponding sheet on which printing is actually performed, and the user is unlikely to judge the orientation of the sheets to be set. Displaying the blank page prevents the inconsistency and enables the user to correctly judge the orientation of the sheet to be set.

The information processing apparatus 300 has the function of generating an AR object in the description above, but the AR display apparatus 200 may have the function of the information processing apparatus 300 and perform the AR object generation and the like.

The container marker 112 is used to identify the sheet container 110 in the description above; however, a radio transmitter or the like may be used. More specifically, each sheet container 110 may include a radio transmitter for transmitting information identifying the sheet container 110, and the sheet container 110 may be identified on the basis of the information transmitted from the radio transmitter.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display system comprising:
    a head-mounted augmented reality (AR) display apparatus including a display that displays a virtual image, the head-mounted AR display apparatus enabling a user to see an object by using the head-mounted AR display apparatus, the object being actually located on a line extending from a line of sight of the user;
    at least one recording medium container that accommodates a recording medium on which an image is to be formed; and
    a display controller of the head-mounted AR display apparatus that displays, on the display, the virtual image of the image to be recorded on the recording medium, the virtual image being superimposed on the recording medium to be placed in the recording medium container, the display controller displaying the virtual image when the recording medium container is aligned with the line of sight of the user.

2. The display system according to claim 1, further comprising:
    a processor that generates the information to be displayed on the display by the display controller,
    wherein, in accordance with orientation of the image to be formed on the recording medium, the processor changes an orientation of the virtual image.

3. The display system according to claim 1, further comprising:
    a printer configured to form the image on the recording medium fed from the recording medium container; and
    a processor that generates the information to be displayed on the display by the display controller,
    wherein in accordance with a setting for transporting the recording medium from the recording medium container to the printer, the processor changes orientation of the information to be generated.

4. The display system according to claim 1,
    wherein the display controller displays, on the display, a virtual first-surface image of an image to be formed on a first surface of the recording medium and a virtual second-surface image of an image to be formed on a second surface of the recording medium.

5. The display system according to claim 4,
    wherein the display controller displays an image representing the recording medium, the image being located between the virtual first-surface image and the virtual second-surface image.

6. The display system according to claim 1,
    wherein the at least one recording medium container includes a plurality of recording medium containers, wherein to form the image on the recording medium, the recording medium is to be fed from a first recording medium container of the plurality of recording medium containers, and wherein when the user looks at the first recording medium container by using the head-mounted AR display apparatus, the display controller displays the virtual image, and when the user looks at a different one of the recording medium containers that is not the first recording medium container, the display controller does not display the virtual image.

7. The display system according to claim 1, wherein the at least one recording medium container includes a plurality of recording medium containers, wherein to form the image on the recording medium, the recording medium is to be fed from a first of the plurality of recording medium containers, and wherein when the user looks at a second recording medium container by using the head-mounted AR display apparatus, the display controller displays, on the display, information indicating that the first recording medium container intended to accommodate the recording medium is not the second recording medium container.

8. The display system according to claim 1, further comprising:

a processor configured to rotate or move an object representing the virtual image displayed on the display.

9. The display system according to claim 1, further comprising:

a processor configured to:
generate the virtual image to be displayed on the display by the display controller,
when the virtual image includes a plurality of images to be respectively formed for a plurality of pages, generate a plurality of pieces of the virtual image for the respective plurality of pages; and
switch one of the pieces of information that is displayed on the display to a different one of the pieces of information for a different one of the pages.

10. A display system comprising:

a head-mounted augmented reality (AR) display apparatus including a display that displays a virtual image, the head-mounted AR display apparatus configured to display an object located behind the display;

at least one recording medium container that accommodates a recording medium on which an image is to be formed; and a display controller of the head-mounted AR display apparatus that displays, on the display, the virtual image of the image to be recorded on the recording medium, the virtual image being superimposed on the recording medium to be placed in the recording medium container, the display controller displaying the virtual image when the recording medium container is aligned with the line of sight of the user.

11. The display system according to claim 10, further comprising:

a processor that generates the information to be displayed on the display by the display controller, wherein, in accordance with orientation of the image to be formed on the recording medium, the processor changes an orientation of the virtual image.

12. The display system according to claim 10, further comprising:

a printer configured to form the image on the recording medium fed from the recording medium container; and a processor that generates the information to be displayed on the display by the display controller, wherein in accordance with a setting for transporting the recording medium from the recording medium container to the printer, the processor changes orientation of the information to be generated.

13. The display system according to claim 10, wherein the display controller displays, on the display, a virtual first-surface image of an image to be formed on a first surface of the recording medium and a virtual second-surface image of an image to be formed on a second surface of the recording medium.

14. The display system according to claim 13, wherein the display controller displays an image representing the recording medium, the image being located between the virtual first-surface image and the virtual second-surface image.

15. The display system according to claim 10, wherein the at least one recording medium container includes a plurality of recording medium containers, wherein to form the image on the recording medium, the recording medium is to be fed from a first recording medium container of the plurality of recording medium containers, and wherein when the user looks at the first recording medium container by using the head-mounted AR display apparatus, the display controller displays the virtual image, and when the user looks at a different one of the recording medium containers that is not the first recording medium container, the display controller does not display the virtual image.

16. The display system according to claim 10, wherein the at least one recording medium container includes a plurality of recording medium containers, wherein to form the image on the recording medium, the recording medium is to be fed from a first of the plurality of recording medium containers, and wherein when the user looks at a recording medium container by using the head-mounted AR display apparatus, the display controller displays, on the display, information indicating that the first recording medium container intended to accommodate the recording medium is not the second recording medium container.

17. The display system according to claim 10, further comprising:

a processor configured to rotate or move an object representing the virtual image displayed on the display.

18. The display system according to claim 10, further comprising:

a processor configured to:
generate the information regarding the virtual image to be displayed on the display by the display controller,
when the virtual image includes a plurality of images to be respectively formed for a plurality of pages, generate a plurality of pieces of the information for the respective plurality of pages; and
switch one of the pieces of information that is displayed on the display to a different one of the pieces of information for a different one of the pages.

19. A control device that controls displaying performed on a head-mounted augmented reality (AR) display apparatus including a display that displays a virtual image and enabling a user to see an object by using the head-mounted AR display apparatus, the object being actually located on a line extending from a line of sight of the user, the control device comprising:

a communication unit that communicates with the display; and a display controller of the head-mounted AR display apparatus that displays, on the display, the virtual image of the image to be recorded on a recording medium to be placed in the recording medium container, the display controller displaying the virtual image when the recording medium container included in the image forming apparatus is aligned with the line of sight of the user.

20. A control device that controls displaying performed on a head-mounted augmented reality (AR) display apparatus including a display that displays a virtual image and capable of displaying, on the display, an object located behind the display, the control device comprising:

a communication unit that communicates with the display; and a display controller of the head-mounted AR display apparatus that displays, on the display, the virtual image of the image to be recorded on a recording medium, the virtual image being superimposed on the recording medium to be placed in a recording medium container, the display controller displaying the virtual image when the recording medium container is aligned with the line of sight of a user.

21. A non-transitory computer readable medium storing a program causing a computer to execute a process for controlling displaying performed on a head-mounted augmented reality (AR) display apparatus including a display that displays a virtual image and enabling a user to see an object by using the head-mounted AR display apparatus, the object being actually located on a line extending from a line of sight of the user, the process comprising:

communicating with the display; and displaying the virtual image superimposed on a recording medium, the virtual image being an image to be formed by an image forming apparatus on a recording medium, the displaying being performed when the recording medium container is aligned with the line of sight of the user.

22. A non-transitory computer readable medium storing a program causing a computer to execute a process for controlling displaying performed on a head-mounted augmented reality (AR) display apparatus including a display that displays a virtual image and capable of displaying, on the display, an object located behind the display, the process comprising:

communicating with the display; and displaying the virtual image superimposed on a recording medium that an image is to be recorded on, the displaying being performed when the recording medium container is aligned with the line of sight of the user.

* * * * *